June 6, 1961 E. G. PERRY 2,987,153
MAGNETIC FLUID SEALS IN MAGNETIC CLUTCHES
Original Filed Oct. 29, 1952 3 Sheets-Sheet 1

INVENTOR
Edward Gordon Perry

BY *Stevens, Davis, Miller & Mosher*
ATTORNEYS

June 6, 1961  E. G. PERRY  2,987,153
MAGNETIC FLUID SEALS IN MAGNETIC CLUTCHES
Original Filed Oct. 29, 1952  3 Sheets-Sheet 2

INVENTOR
Edward Gordon Perry

BY *Stevens, Davis, Miller & Mosher*
ATTORNEYS

June 6, 1961 E. G. PERRY 2,987,153
MAGNETIC FLUID SEALS IN MAGNETIC CLUTCHES
Original Filed Oct. 29, 1952 3 Sheets-Sheet 3
FIG. 3.
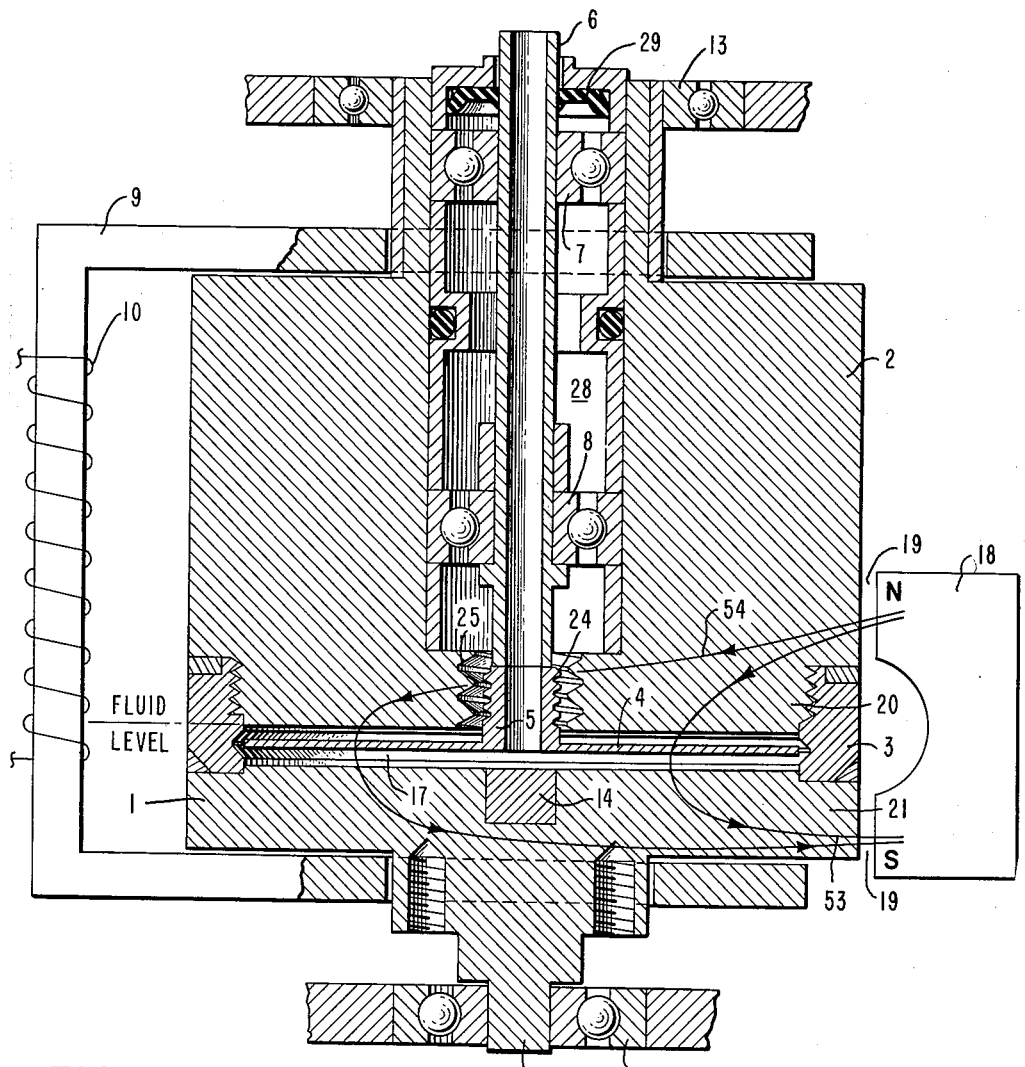
FIG. 4.
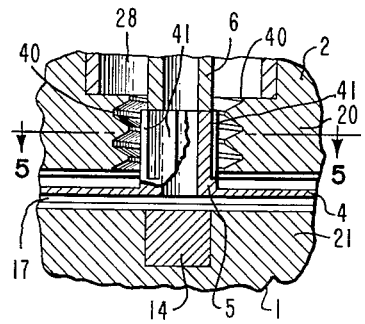
FIG. 5.
INVENTOR
Edward Gordon Perry
BY Stevens, Davis, Miller & Mosher
ATTORNEYS

United States Patent Office 2,987,153
Patented June 6, 1961

2,987,153
MAGNETIC FLUID SEALS IN MAGNETIC CLUTCHES
Edward Gordon Perry, Dallas, Tex., assignor to Texas Instruments Incorporated, Dallas, Tex., a corporation of Delaware
Original application Oct. 29, 1952, Ser. No. 317,531, now Patent No. 2,809,733, dated Oct. 15, 1957. Divided and this application Sept. 13, 1957, Ser. No. 687,334
4 Claims. (Cl. 192—21.5)

This invention relates to magnetic seals in magnetic clutches and like apparatus employing a magnetizable medium such as a fluid or material.

Magnetizable mediums are generally composed of a metallic powder such as iron powder alone or suspended in some fluid, such as an oil, with the characteristics which most nearly meet the working conditions of the clutch. This magnetic material or fluid is put into the clutch in what is known as the working gap. The portions of the clutch forming the working gap are composed of magnetic material to form magnetic poles on either side of the working gap. A torque cup or disc is attached to an output shaft which is supported by the clutch housing in bearings so that the torque cup or disc will be free to rotate in the working gap.

Whenever a signal is applied to the clutch from any external source such as a permanent magnet or a signal coil, the flux produced passes from one pole to the other through the working gap and hence through the magnetizable medium. This causes the iron particles to become magnetized and to line up or "stiffen" in the direction of the flux. As the magnetic fluid "stiffens," it produces an increase in the coupling torque between the cup and the clutch housing which constitutes the driving member of the clutch. Thus the output shaft will rotate or tend to rotate, if restrained, in the direction of the clutch housing rotation. It can be seen that if the output shaft is restrained and the clutch housing rotates, the torque cup must disturb or break the alignment of these magnetic force lines. As these lines of force are broken the shearing forces and heat generated tends in time to break down the magnetic fluid and cause the oil to evaporate. If enough of the fluid evaporates the iron powder concentration will become greater and result in erroneous measurements of applied signals.

Another effect that may be obtained when a signal is applied to the clutch is that stray magnetic forces may attract the iron powder out of the working gap. The effect of iron powder leaving the working gap is twofold; the first is that the iron powder may get into the output shaft bearings and cause them to foul or even bind and, the second is that the magnetic fluid concentration is weakened which, as in the case of too great a concentration, results in erroneous measurement of applied signals.

Accordingly, it is an object of this invention to provide a means to combat the tendency for the magnetic fluid to become either weakened or concentrated by the effect of magnetic fields, high temperatures, shearing forces, or other factors influencing magnetic fluids.

It is a further object of this invention to provide a magnetic seal to prevent iron filings from leaving the working gap of the clutch by controlling the fluid level and the magnetic path across the working gap.

It is another object of this invention to provide a reservoir of magnetic fluid outside of the working gap, provide seals to prevent the iron filings from getting into the bearings and to keep the fluid circulating so that the working life of the fluid will be prolonged.

It is a still further object of this invention to provide a means to keep the iron filings or particles out of the bearings and in the working gap and to provide a supply of clean oil which will compensate for any evaporation of the oil in the magnetic fluid mixture.

It is another object of this invention to provide a magnetic seal for a clutch whereby the clutch will operate more efficiently, economically, and accurately than has heretofore been possible.

Other objects and advantages of the present invention will become readily apparent from a detailed consideration of the following description when taken in conjunction with the drawings in which:

FIGURE 3 is a sectional view in elevation showing a further arrangement of the magnetic seal of the present invention as applied to a magnetic fluid clutch;

FIGURE 4 is a sectional view in elevation showing a modified form of the magnetic seal of the present invention as applied to an output shaft of a magnetic fluid clutch; and FIGURE 5 is a view in section taken along line 5—5 of FIGURE 4.

Figure 1:
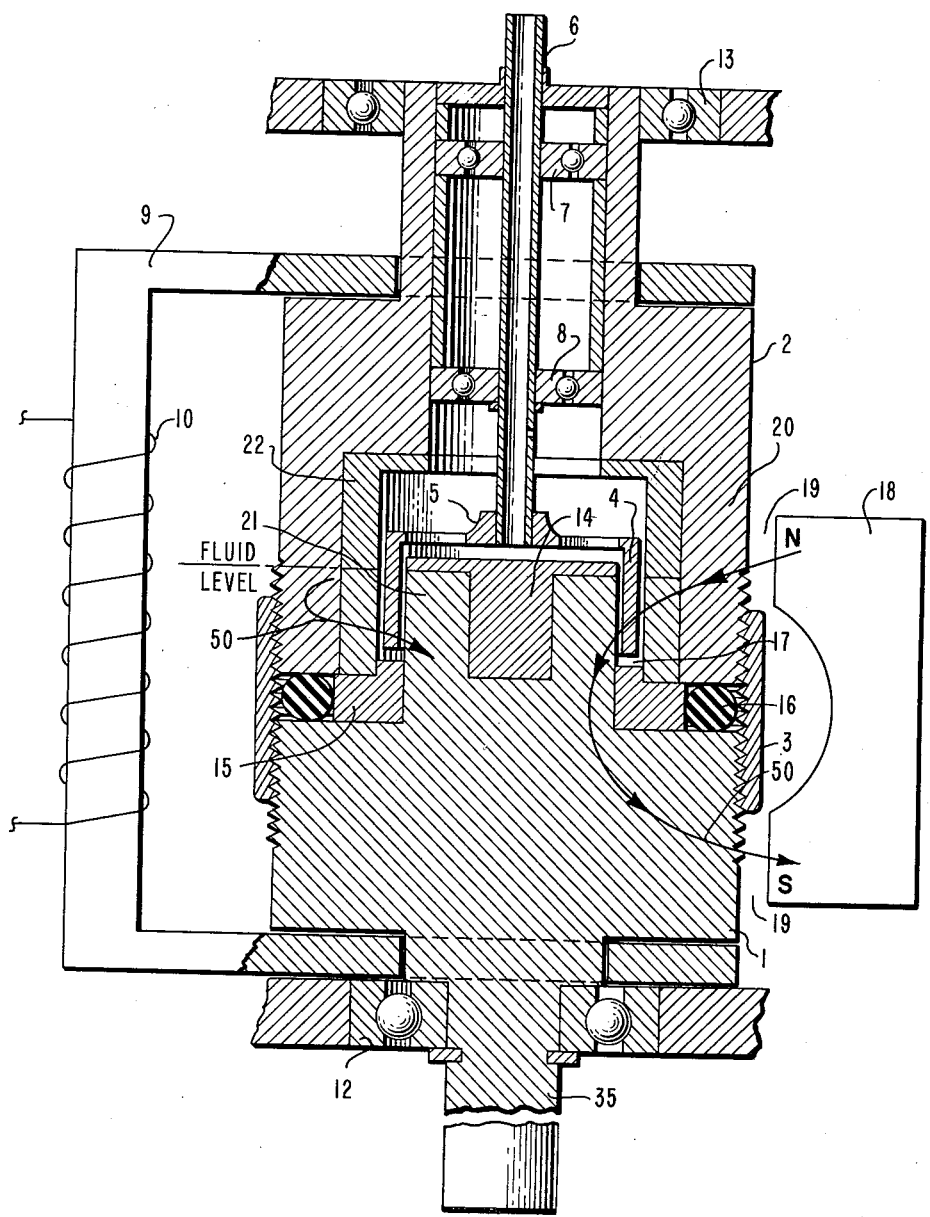
FIGURE 1 is a sectional view in elevation showing the magnetic seal of the present invention as applied to a magnetic fluid clutch having an external field core and signal coil.
Figure 2:
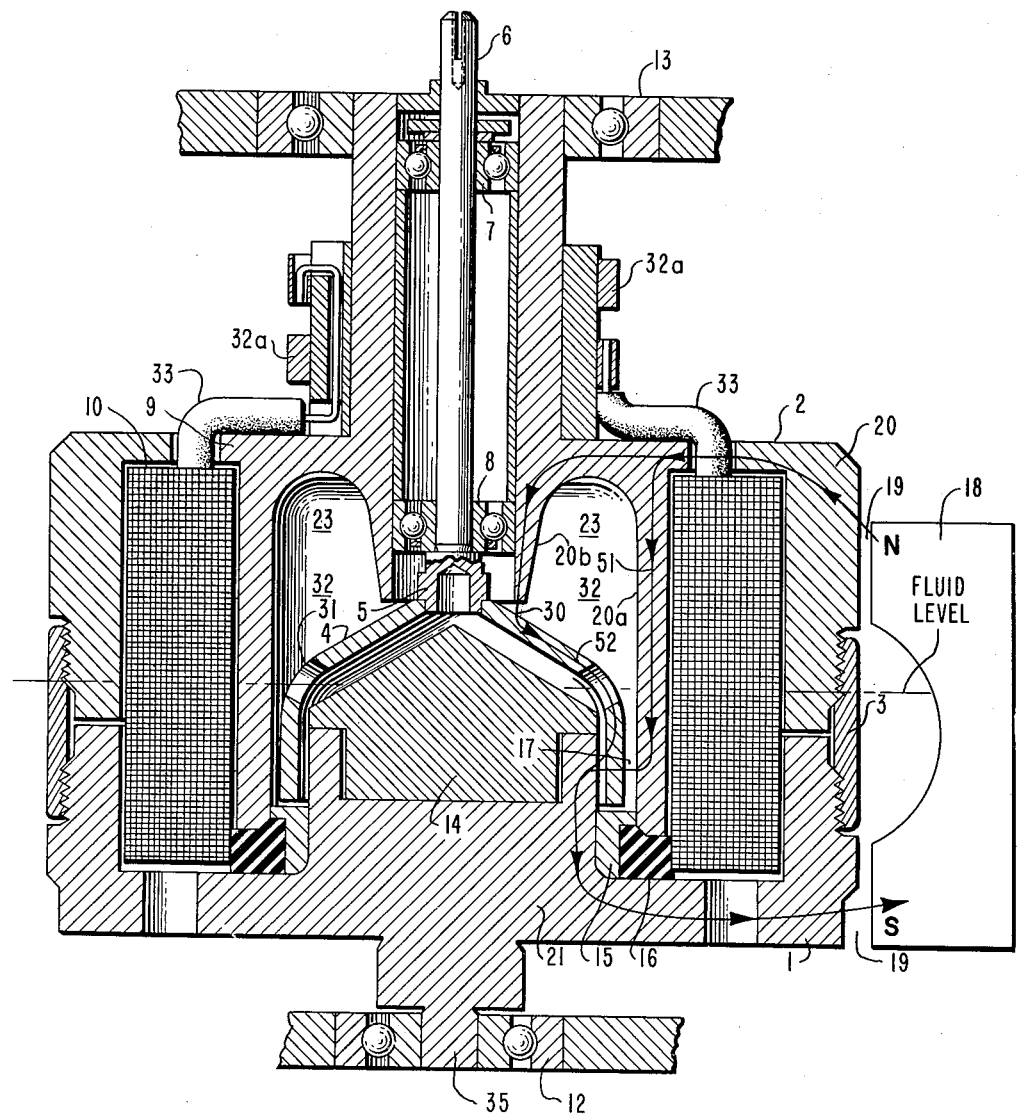
FIGURE 2 is a sectional view in elevation showing the magnetic seal of the present invention as applied to a magnetic fluid clutch having a built-in signal coil.

FIGURES 1, 2 and 3 show different types of clutches for the specific purpose of illustrating that the magnetic seal of this invention is not confined to only one type of clutch construction. FIGURE 1 represents a clutch to which signals are applied from an external field core and signal coil. The magnetic material in the clutch is arranged to apply the flux generated by the signal across the working gap and to complete the circuit with the surrounding field core. The clutch in FIGURE 2 shows the signal coil built into the clutch. External signals are applied to the signal coil through collector rings with the magnetic circuit being competed within the clutch. The clutch shown in FIGURE 3 has the signal applied in the same manner as the clutch in FIGURE 1, the major difference in construction being that in FIGURE 3 the magnetic fluid acts on a torque disc rather than a torque cup.

The method of applying operating signals to the clutches, such as the external field core and signal coil as shown in FIGURE 1 or the coil within the clutch as shown in FIGURE 2, is a separate principle and is well known in the art. It forms no part of the present invention and is to be distinguished from the steady state flux means which constitutes part of the magnetic seal of the present invention.

Referring now to the drawings, the clutch housing for a magentic fluid clutch as shown in FIGURE 1 is composed of a lower housing section 1 joined to a driving shaft 35 and an upper housing section 2 joined to lower housing section 1 by a ring 3. Hub 5 joins a torque cup 4 to an output shaft 6 which in turn is supported in the housing section 2 by roller bearings 7 and 8 so that the output shaft is free to turn. The torque cup 4 extends down into the working gap 17. Leakage of magnetic fluid from the working gap 17 is prevented by means of a liner ring 15 and an O ring seal 16 located between the clutch housing sections 1 and 2. A nonmagnetic section 14 fits directly underneath the torque cup 4 to limit the magnetic path through the clutch to that portion of the clutch represented by the magnetic poles 20 and 21. The clutch as a whole is supported by bearings and frame support sections indicated generally as 12 and 13 at the bottom and top respectively, of the clutch. External signals to operate the clutch are applied through a field core 9 and signal coil 10. A permanent magnet 18, or if desired an electromagnet, is positioned to be separated from the clutch housing by air gaps 19.

In this particular clutch, magnetic fluid fills the working gap to the point where magnetic pole 21 joins the non-magnetic material 14 and shown on the FIGURE by the fluid level line. Flux from the north pole N of permanent magnet 18 crosses the air-gap 19 to pole 20, flows from pole 20 through the working gap 17 to the other magnetic pole 21 and completes the circuit by crossing air-gap 19 at the south pole S of permanent magnet 18. The flux path is indicated as 50. This flux, crossing the working gap 17, causes the fluid to become magnetized which in turn exerts a very strong force on the magnetic particles to keep them in the working gap 17. Thus any tendency for the iron particles to get up into the bearings 7 and 8 by virtue of operation of the clutch is prevented. The proper placement of non-magnetic material 22 will eliminate stray flux currents which tend to pull the iron powder out of the working gap.

The clutch shown in FIGURE 2 is similar to the clutch of FIGURE 1, but shows the signal coil 10 built into the clutch housing sections 1 and 2; the fluid level in a reservoir 32 above the working gap 17; and a cavity 23 splitting magnetic pole 20 into two pole parts 20a and 20b. Operating signals for coil 10 are transmitted through collector rings 32a and conductors 33 connected to coil 10. Pole part 20a bounds the working gap 17 and pole part 20b bounds the reservoir 32. Flux from the north pole N of permanent magnet 18, as before, crosses the air gap 19 to magnetic pole 20, but in this clutch the magnetic flux is divided into two paths. One on the flux paths is traced from pole 20a across the working gap 17 to pole 21 and then completes its path back to the south pole S of magnet 18. This flux path is indicated as 51. The flux in pole 20a has no influence on the fluid above the working gap 17 since the increased reluctance of the air gap above the top of pole 21 plus the shielding effect of non-magnetic material 14 does not allow flux to cross over and thus magnetize the fluid. Therefore, it is necessary to supply an additional magnetic seal to control the fluid above the top of pole 21. This additional magnetic seal is supplied by the second flux path which is traced from pole 20b across to the torque cup 4 at point 30 in the vicinity of hub 5. By taking advantage of the fact that the magnetic potential of the cup 4 is half-way between the magnetic potential of the poles 20 and 21 of the working gap, the flux from 20b to point 30 can complete its path by traveling down the cup 4 to pole 21 and back to the permanent magnet 18 at the south pole S. This flux path is indicated as 52. Any magnetic fluid which reaches this magnetic seal in the vicinity of the hub 5 will thus be magnetized at that point and iron powder prevented from getting into the bearing area containing the bearings 7 and 8. Cavity 23, which splits the magnetic pole 20, is in direct communication with the working gap 17 but is inverted relative thereto; the pole part 20b extends downwardly bounding one side of the cavity 23. This arrangement prevents the passage leading to bearing 8 from ever becoming submerged regardless of the angle to which the clutch is tilted and is useful as a means of filling the clutches during assembly. This clutch has the advantage that the life of the fluid is extended since the reservoir provides a reserve fluid supply for circulation in the working gap and therefore, no particular portion of the fluid is worked continuously. Holes 31 drilled in the torque cup 4 allow for filling the working gap 17 and for circulation of the fluid.

FIGURE 3 represents a further modification of the use of a steady state flux source to provide a magnetic seal and therefore keep iron particles from migrating out of the working gap and into the bearings. As stated before, this clutch shown in FIGURE 3 is very similar to the one shown in FIGURE 1 with the exception of a flat torque disc 4 and a corresponding flat working gap 17. In addition to the permanent magnet 18 which generates a flux path 53 from north pole N through pole 20, working gap 17, pole 21, and back to the south pole S, the clutch is also provided with two helices 24 and 25. Helix 24, which is formed as a part of the output shaft 6, can be either a right-hand or left-hand thread. Helix 25 can also be formed with either a right-hand or left-hand thread. However, it is preferred that the two threads 24 and 25 are formed oppositely; that is, if helix 24 is a right-hand thread, then helix 25 is a left-hand thread. Helix 24 is inside of helix 25 and the crowns of the threads cross each other at a number of points along their axial lengths. Since both helices are made of magnetic material, a flux path 54 is generated through them from permanent magnet 18. Since the closer crossing points at the crowns have a lower reluctance than the thread roots or non-crossing points at the crowns, high intensity fields are created at these points. If there is a relative motion between the two helices, the position of the cross points producing the high intensity field will travel up or down the axis of the shaft depending upon the direction of rotation. If magnetic particles are in the presence of this type of field, they will tend to be carried along with the high intensity field. Thus there will be set up a definite pumping action. This pumping action of the helical magnetic field is pronounced enough for a definite separating action to take place so that liquid can flow through the field in one direction while magnetic particles are forced against the flow of the fluid in the other direction. In this clutch, the helical seal is a continuous part of the working gap 17. With the working gap 17 arranged in this manner, the magnetic particles entering between the helices 24 and 25 will be pumped back into the magnetic fluid in gap 17 to keep a constant iron-oil ratio instead of permitting the particles to pile up at a point outside of the gap 17. Another advantage of this helical pumping and sealing arrangement is that a reservoir of clean oil can be maintained around the output shaft 6 in the area indicted as 28. A cup ring seal 29 can be arranged at the top of the clutch to prevent spilling of the fluid should the clutch be inverted. Any loss of oil by evaporation can be taken care of by the surplus oil in the reservoir 28.

FIGURES 4 and 5 show a modification of the magnetic seal as applied to the output shaft 6. In this particular arrangement the clutch housing section 2 is provided with a helix 40 and shaft 6 is provided with a plurality of vertical splines 41. The operation of this arrangement will be similar to the two helices shown in FIGURE 3 in that a downwardly traveling magnetic field will be established between the helix 40 and splines 41 to pump the magnetic particles back into the working gap 17. It is, of course, appreciated that the helix 40 can be on shaft 6 and the splines 41 on the clutch housing section 2.

It is also possible to employ a helix on clutch housing section 2 similar to helix 40 with the smooth cylindrical outer surface of shaft 6. In this instance, the crowns of the helix and the corresponding points on the shaft 6 will have a lower reluctance than the thread root portions of the helix and their corresponding points. Thus, a high intensity field will be created at these points which can be made to travel downwardly upon the proper selection of the direction of rotation of the helix, thereby creating a definite pumping action to return the particles to working gap 17 while permitting the fluid to pass into the area 28. Also, the helix can be instead on the shaft 6 and can be made to cooperate with the smooth cylindrical bore of the clutch housing section 2 which surrounds the shaft 6 in this area.

If desired an electromagnet can be used in place of permanent magnet 18 which supplies the flux to operate the magnetic seals as above described. The use of an electromagnet will have the advantage of providing a control over the strength of the flux.

It is quite apparent that the use of the permanent magnet 18 or an electromagnet in the manner above described will result in a bias being placed on the clutch. This, of course, is desirable in clutches in a push-pull arrangement or for any other reason. However, oftentimes it is desirable to operate a clutch without a bias. In these cases a ring magnet can be built into the housing section 2 around the pair of helices of FIGURE 3 or the helix 40 and vertical splines 41 of FIGURE 4. Thus, the effectiveness of the magnetic seal and pump will be preserved without unduly interfering with the normal operation of the clutch.

Also the same result can be accomplished by any other means that would effectively apply a magnetic flux to the magnetic trap (the pair of helices of FIGURE 3 or the helix 40 and vertical splines 41 of FIGURE 4) with or without applying a bias to the clutch. For example, a series of small bar magnets can be spaced around the trap or a magnetic path can be established around the trap and a permanent or electromagnet can be placed adjacent to the path. In the latter arrangement the permanent or electromagnet can be shielded from the working gap, if desired. Thus it can be seen that any means can be employed as long as the means functions to apply a suitable magnetic flux to the magnetic trap.

While the present invention has been described with reference to magnetic fluid clutches, its use with magnetic particle clutches very broadly is quite apparent and such use is not to be precluded in any way. For example, this invention would operate on a clutch in which only iron powder is used.

While this invention has been shown and described in conjunction with specific embodiments, nevertheless, various changes and modifications obvious to one skilled in the art are within the spirit, scope, and contemplation of the present invention.

This application is a division of application Serial No. 317,531, filed October 29, 1952, now Patent No. 2,809,733, granted October 15, 1957.

What is claimed is:

1. In a magnetic clutch including a driving member, a driven member, a working gap between said members, a magnetizable medium in said working gap, and means to couple said members, the improvement that comprises one of said members defining a reservoir above said working gap, said reservoir including a cavity in open communication with said working gap and inverted relative thereto so as to receive said magnetizable medium when said clutch is inverted, said cavity splitting said one of said members into two poles, one bounding said working gap and the other bounding said reservoir, said one member including a bearing area closely adjacent said other member opening into said reservoir, means to generate a clutch controlling flux so that the generated flux will pass through said clutch in two defined paths, one of said paths passing through said pole bounding said working gap, through said working gap, and through said other member, the other of said paths passing through said pole bounding said reservoir, through said reservoir, through said other member, and through said working gap, said flux passing through said clutch acting to seal said magnetizable medium in said working gap and said reservoir.

2. In a magnetic clutch including a lower and an upper clutch housing connected together to form one of the driving and driven members of said clutch, said housings defining therebetween a working gap, a magnetizable medium in said working gap, a shaft bearing mounted in the upper clutch housing, a torque element connected to the end of said shaft and located in said working gap, said shaft and torque element forming the other of the driving and driven members of said clutch, and means to couple said members the improvement that comprises said upper clutch housing defining a reservoir above said working gap including a cavity in open communication with said working gap and inverted relative thereto so as to receive said magnetizable medium when said clutch is inverted, said cavity splitting said upper clutch housing into two poles, one bounding said working gap and the other bounding said reservoir, said clutch housing defining a bearing area opening into said reservoir at a point closely adjacent said torque element, means to generate a clutch controlling flux so that the generated flux will pass through said clutch in two defined paths, one of said paths passing through said pole bounding said working gap and said working gap, the other of said paths passing through said pole bounding said reservoir, said reservoir, said other member, and said working gap, said flux acting to magnetically seal said magnetizable medium in said working gap and in said reservoir at a location between said torque element and the opening of said area to prevent entrance of the magnetizable medium into said bearing area from said reservoir.

3. The improvement as defined in claim 1 wherein said means to generate flux includes a permanent magnet.

4. The improvement as defined in claim 1 wherein said means to generate flux includes an electromagnet.

References Cited in the file of this patent

UNITED STATES PATENTS

| | | |
|---|---|---|
| 2,612,248 | Feiertag | Sept. 30, 1952 |
| 2,651,754 | Perry et al. | Sept. 8, 1953 |
| 2,690,241 | Bachman | Sept. 28, 1954 |
| 2,713,927 | Rabinow | July 26, 1955 |